April 22, 1969  C. H. TORMAN  3,439,593
SPREADER
Filed Sept. 30, 1966  Sheet 1 of 3

INVENTOR
CHARLES H. TORMAN
BY Robert M. Duckworth
ATTORNEY 3,439,593
SPREADER
Charles H. Torman, Orlando, Fla., assignor to
Orlando Paving Company, Orlando, Fla.
Filed Sept. 30, 1966, Ser. No. 583,195
Int. Cl. E01c 19/18, 19/48
U.S. Cl. 94—44                                                    1 Claim

ABSTRACT OF THE DISCLOSURE

A shoulder spreader apparatus for spreading road building materials and having a hopper mounted to a wheeled frame which may be loaded from a dump truck. A motor driven variable speed rotatable screw in the bottom of the hopper moves the material toward one side of the hopper and out an opening. The hopper is connected through the opening in the side to an adjustable guide means for directing the flow of the material passing through the opening. Rollers are attached to the front of the hopper to engage the tires of the dump truck loading the hopper and a strike off blade may also be provided.

---

This invention relates to a spreader for spreading materials and more particularly to a shoulder spreader for spreading road building materials such as asphalt mixes, stone, gravel, or the like.

Shoulder spreaders generally receive materials from a dump truck and distribute it in a smooth spread over a desired area. For instance, an asphalt mix might be dumped into the hopper of a spreader being moved along the edge of a road. The spreader will spread the material in the hopper over the width of a shoulder, and then strike it off to a predetermined thickness as the machine moves forward. The spread must then be rolled to compact it.

In the past, shoulder spreaders have been used in which a hopper has an open bottom with a conveyor belt located in the bottom opening. Materials placed in the hopper are conveyed to an open side of the hopper by the conveyor belt, where the conveyed materials fall off the end of the conveyor. The material being discharged by the belt must be spread and smoothed by a strike off blade. This type of prior art spreader cannot generally be used for spot applications and materials, such as asphalt mixes, tend to stick to the conveyor belt, and then drop off the belt onto a paved portion of a road. These pieces of material are then very difficult and time consuming to clean up.

The present invention advantageously allows spreadable materials to be deposited as desired without pieces of material being scattered onto prepared road surfaces and allows for an accurate depositing of material on a roadbed or shoulder. The rate of discharge of material onto a receiving surface may be closely regulated by the present spreader and the rate may be varied according to the spreading operation being performed. It should be noted that, while the present spreader is illustrated connected to a road grader, it may also be used with a motor truck, tractor or may be self-propelled as desired. An additional advantage of the present spreader is that the propelling means may be adapted for lifting it above the surface for quick maneuverability such as between work locations.

The present invention has a wheeled frame to which a hopper with two longitudinal sides, two transverse sides and a closed bottom has been mounted in such a manner that the hopper may be loaded with materials from a dump truck. A motor driven rotatable screw has been located in the bottom of the hopper to move the material in the bottom of the hopper longitudinally toward one transverse side and out an opening in the side of the closed bottom of the hopper. Upon the material leaving the hopper, a guide means directs the material to the desired area along a road shoulder. Rollers are attached to the front of the spreader to engage the tires of the dump truck while the spreader is being loaded. The present spreader may be propelled in any desired manner, but I prefer to connect it to the front of a motor grader, or the like. A strike off blade will usually be attached to the motor grader or may be attached to my spreader to strike off the material being spread to a smooth level as it is discharged from the spreader.

Other objects, features, and advantages of this invention will be apparent from a study of the written description and the drawings in which.

Figure 1:
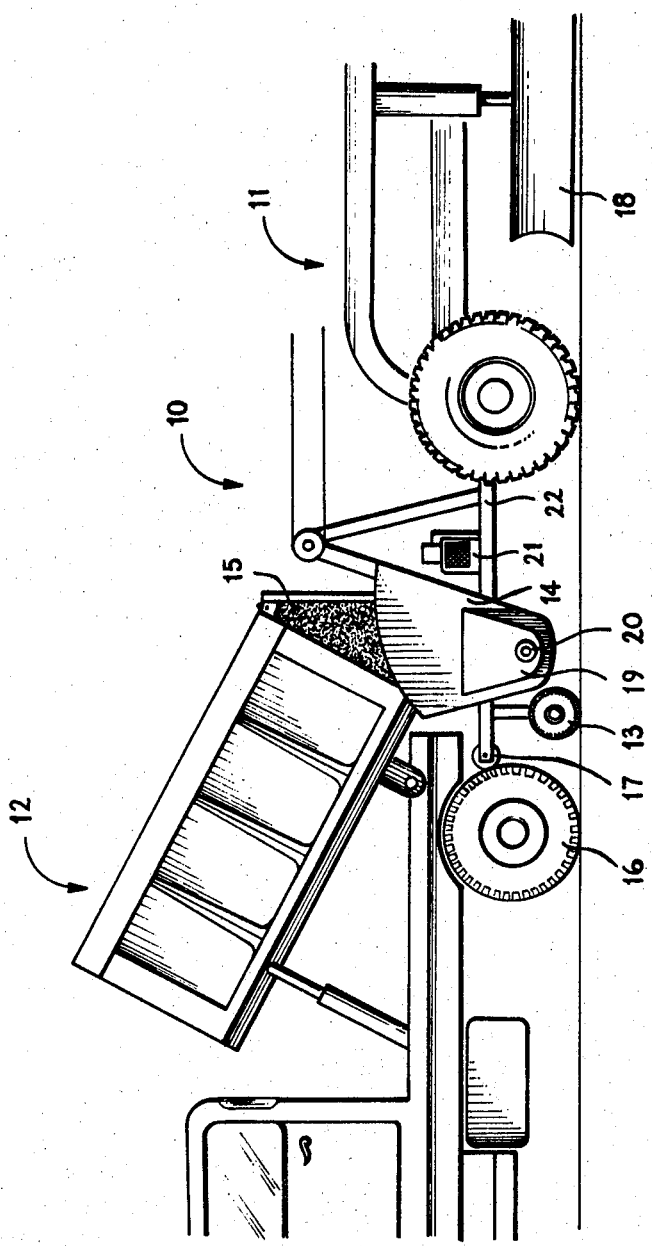
FIGURE 1 is a side view of an embodiment of the present invention connected to a motor grader and being loaded by a dump truck.

Referring specifically to FIGURE 1 there is shown the offset spreader of the present invention generally indicated at 10 being propelled by a motor grader 11 and being loaded by a dump truck 12. The spreader 10 has wheels 13, which may have hard rubber tires, or the like, and a hopper 14 for receiving the material 15 from the dump truck 12. The truck 12 has wheels 16 which are shown against rollers 17 which rollers allow the spreader to continue operation while being loaded by the truck. The spreader 10 can propel the truck 12 via the rollers 17 and wheels 16 while the truck is loading the spreader, thereby maintaining contact between the truck and spreader. The motor grader 11 has a strike off blade 18 which may be used to strike off and level the material being spread along a road shoulder or the like by the spreader 10. It should be noted at this point that, while the strike off means 18 is shown connected to the motor grader 11, it may also be connected to the spreader 10 or the strike off operation may be performed by a separate machine such as another motor grader without departing from the spirit and scope of the present invention.

The spreader 10 has a guide means 19 for directing the material being spread toward the earth at the desired place. This guide means 19 may be fixedly attached to the hopper 14 but I prefer that it be transversely adjustable so that the spread of the material may be varied. The sleeve 20 holds the screw blade to be discussed later and allows the guide means to be moved transversely of the hopper. A motor 21 is used to rotate a rotatable screw located in the hopper and is preferably a variable speed motor since the torque needed for rotating the screw will depend upon the material being spread and the rate of spread desired. A variable reduction gearbox may also be connected to the motor for varying the speed of rotation of the screw. The motor is fastened to the framework 22.

Figure 2:
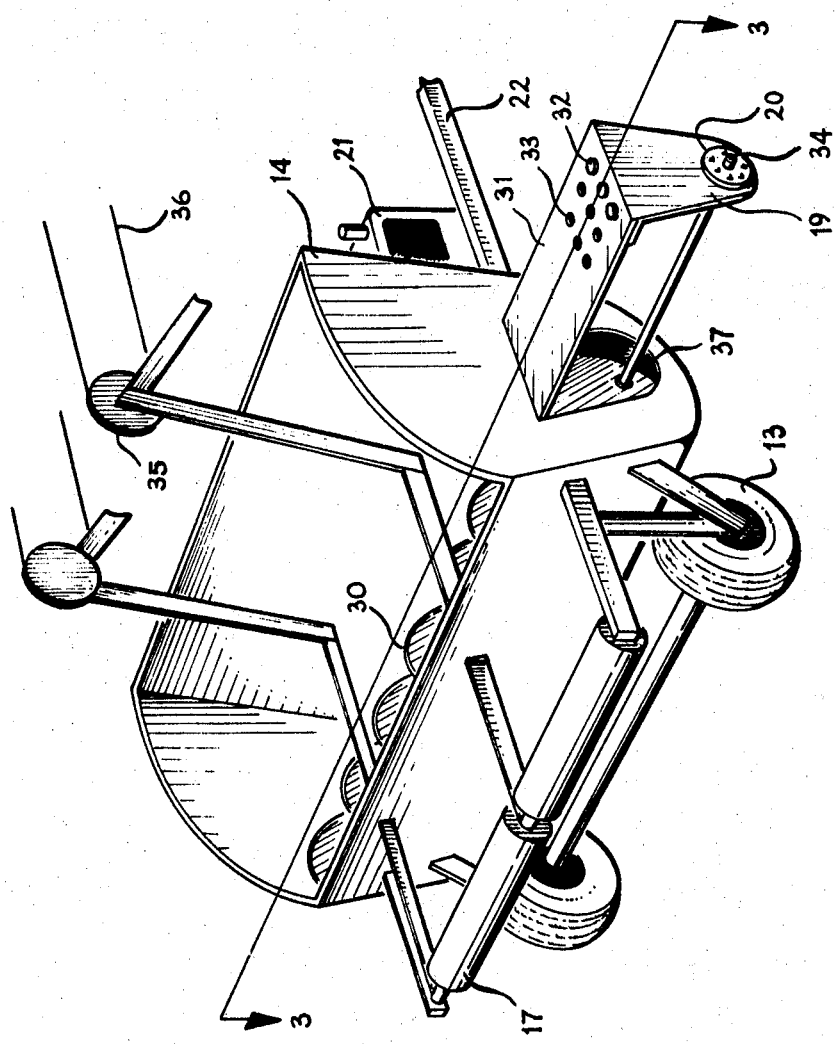
FIGURE 2 is a perspective view of the present invention.

Referring now to FIGURE 2, a perspective view of the present spreader is shown with hopper 14 connected to framework 22 and with a rotatable screw 30 located in the bottom of hopper 14. The hopper 14 and frame 22 are supported by wheels 13 which ride on the ground or along a roadbed being put down. Rollers 17, guide means 19, sleeve 20 and motor 21 are all connected to the spreader as previously described. The guide means 19 is shown fastened to the guide support 31 by bolts 32 but any other means may be used as desired. Holes 33 allow the guide means 19 to be varied by unbolting the guide 19, from the guide support 31, then sliding sleeve 20 on the screw shaft 34 to a new set of bolt holes 33 and rebolting the guide 19. The framework 22 extends through and braces the hopper 14 and on the upper part of frame 22 is located a pair of pulleys 35 with cables 36 encircling them and leading back to the propelling means. These cables 36 are used to raise the spreader 10 together with any material that may be located in the hopper 14 off the ground for quick maneuvering, such as turning or changing work areas with minimum delay. When the cables 36 are taken up, the entire spreader 10 is tilted on its framework and held there while maneuvering the propelling means as desired. Material dumped in the hopper 14 is moved longitudinally with respect to the hopper by the rotation of screw 30 which forces the material out an opening 37 where it is directed to the earth by the guide 19 and guide support 31.

Figure 3:
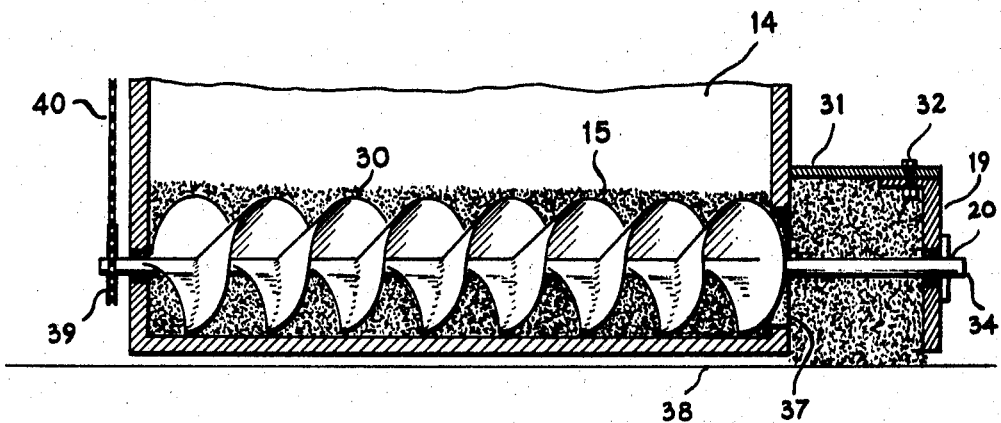
FIGURE 3 is a front cutaway view of FIGURE 2 taken along lines 3—3.

Turning now to FIGURE 3, a front cutaway view is shown in which the material 15 is shown in hopper 14 with the rotatable screw conveying material 15 to opening 37. The guide 19 and the guide support 31 can be seen forcing the material 15 in a downwardly direction onto a road shoulder 38. The screw 30 has a shaft 34 which turns in sleeve 20. The screw 30 is rotated by a chain gear 39 being driven by a chain 40.

Figure 4:
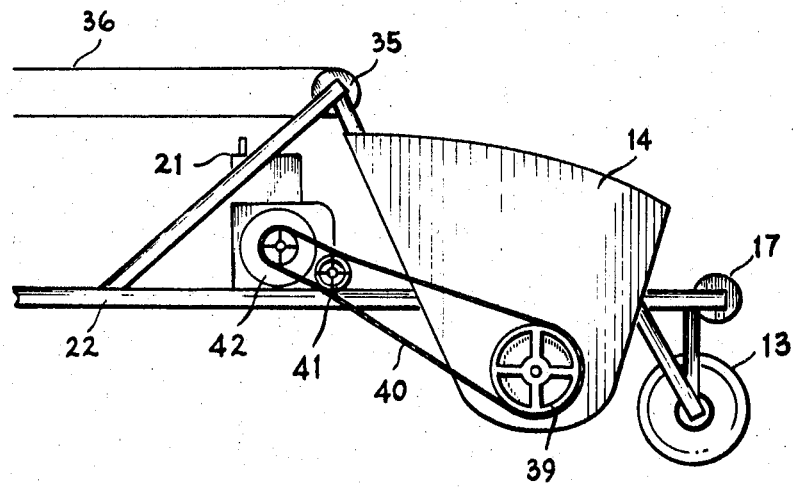
FIGURE 4 is a side view of the embodiment of FIGURE 2.

The chain drive can best be seen in the side view of FIGURE 4 with hopper 14, roller 17 and wheels 13 there shown. The chain 40 and chain gear 39 are driven by another chain gear 41 which is in turn driven by a reduction gear box 42. The gear box 42 is driven by the motor 21.

In operation the spreader will be connected to a motor grader or the like and will be propelled along a roadbed. A dump truck can load the spreader while it is being propelled along and the material being loaded into the hopper 14 will be conveyed onto the road shoulder by the rotating screw 30. The material is conveyed through opening 37 and guided to the road shoulder 38 by the guide 19 and guide support 31. Once on the shoulder the material is struck off by a strike off blade and then rolled to compact it down. The spread may be varied by varying the speed of rotation of the screw 30 and by moving the guide 19.

From the foregoing description it will be clear that an offset spreader has been provided for accurately spreading materials along a road shoulder, or the like, but it should also be clear that other uses such as trench filling, are contemplated as being within the range of applications.

It is also to be understood that, while one example has been set forth, other variations are contemplated as being within the spirit of the invention. For instance, guide support 31 could be made adjustable rather than guide means 19 and an adjustable strike off blade could be attached to the guide support 31 to give better control of the flow of the material.

This invention is not to be construed as limited to the particular forms disclosed herein, since these are to be regarded as illustrative rather than restrictive.

I claim:
1. A shoulder spreading vehicle for spreading road building materials, or the like, along the shoulder of a smooth surface and having propelling means to propel said spreader, comprising in combination:
 (a) a wheeled frame;
 (b) a hopper mounted to said wheeled frame for receiving spreadable material from a loading vehicle, said hopper having two longitudinal sides, two transverse sides and a closed bottom;
 (c) a rotatable screw having an elongated shaft at one end thereof, said screw being located in the bottom of said hopper for the longitudinal movement of the material in said hopper;
 (d) rollers attached to one longitudinal side of said hopper, said rollers being positioned to engage the tires of said loading vehicle while said loading vehicle is loading said hopper;
 (e) said hopper having an opening located in one of said transverse sides whereby said spreadable material is adapted to be discharged from said hopper;
 (f) guide means carried by said hopper for directing the material being discharged through said opening, said guide means having top and side members, and said side member being movably supported relative to said hopper;
 (g) said guide means side member rotatably and slidably supporting said rotatable screw elongated shaft, whereby said elongated shaft is adapted to rotate thereon and said side member can be moved horizontally along said shaft for varying the width of the material discharged from said hopper;
 (h) variable speed drive means adapted for rotating said rotatable screw at different speeds of rotation;
 (i) strike off means connected to said spreading vehicle for striking off said discharged spreadable material; and
 (j) lifting means whereby said propelling means is adapted to lift said spreader for rapid maneuverability of said spreader.

References Cited

UNITED STATES PATENTS

| | | | |
|---|---|---|---|
| 2,757,587 | 8/1956 | Mentes | 94—44 |
| 2,848,930 | 8/1958 | Thompson | 94—44 |
| 3,109,351 | 11/1963 | Dunn | 94—44 |
| 3,130,654 | 4/1964 | Apel et al. | 94—46 |
| 3,131,616 | 5/1964 | Gostovich | 94—46 |

FOREIGN PATENTS 1,009,497  11/1965  Great Britain.

OTHER REFERENCES

Barber-Greene Manual, pp. 8–9.

Blaw-Knox Bulletin (inside pages only).

Roads and Streets, January 1948, pp. 62–63.

JACOB L. NACKENOFF, *Primary Examiner.*

U.S. Cl. X.R.

94—46